United States Patent
Tashiro

(10) Patent No.: US 10,224,001 B2
(45) Date of Patent: *Mar. 5, 2019

(54) DISPLAY CONTROL APPARATUS, DISPLAY CONTROL METHOD, DISPLAY CONTROL SYSTEM, AND STORAGE MEDIUM

(71) Applicant: CANON KABUSHIKI KAISHA, Tokyo (JP)

(72) Inventor: Masanori Tashiro, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 158 days.

This patent is subject to a terminal disclaimer.

(21) Appl. No.: 14/873,574

(22) Filed: Oct. 2, 2015

(65) Prior Publication Data

US 2016/0027403 A1  Jan. 28, 2016

Related U.S. Application Data

(63) Continuation of application No. 13/921,443, filed on Jun. 19, 2013, now Pat. No. 9,197,846.

(30) Foreign Application Priority Data

Jun. 26, 2012  (JP) .................................. 2012-143527

(51) Int. Cl.
G06T 1/00     (2006.01)
G09G 5/00     (2006.01)
H04N 7/01     (2006.01)
G06T 1/20     (2006.01)
G06F 3/14     (2006.01)

(52) U.S. Cl.
CPC ............... G09G 5/006 (2013.01); G06F 3/14 (2013.01); G06F 3/1454 (2013.01); G06T 1/20 (2013.01); H04N 7/0127 (2013.01); G09G 2340/0407 (2013.01); G09G 2340/0435 (2013.01); G09G 2350/00 (2013.01)

(58) Field of Classification Search
CPC ......................... G09G 2340/0435; G06T 1/20
See application file for complete search history.

(56) References Cited

U.S. PATENT DOCUMENTS 7,450,130 B2 * 11/2008 Swedberg ................ G09G 5/00
345/473
8,077,242 B2 * 12/2011 Chung ............... H04N 5/23293
348/333.01
9,041,621 B2 * 5/2015 Kim ........................ G06F 3/016
345/1.3

(Continued)

FOREIGN PATENT DOCUMENTS

JP  H08-116513 A   5/1996
JP  H08-163556 A   6/1996
JP  2008-204042 A  9/2008

Primary Examiner — Charles Tseng
(74) Attorney, Agent, or Firm — Venable LLP

(57) ABSTRACT

A display control apparatus, which executes control required to display a moving image, received via a network, on a display unit, the apparatus comprising: an input unit configured to input an operation instruction required to operate the display control apparatus; and a control unit configured to execute control required to display, on the display unit, a moving image at a frame rate depending on whether or not processing according to the operation instruction input by the input unit is executed.

7 Claims, 10 Drawing Sheets

(56) References Cited

U.S. PATENT DOCUMENTS

| | | | |
|---|---|---|---|
| 9,197,846 B2 | 11/2015 | Tashiro | |
| 2005/0262123 A1* | 11/2005 | Hirano | H04N 21/2662 |
| 2010/0245316 A1 | 9/2010 | Cheng | |
| 2011/0128440 A1* | 6/2011 | Koike | G06T 1/00 |
| | | | 348/441 |
| 2012/0198488 A1* | 8/2012 | Son | H04N 21/4227 |
| | | | 725/14 |
| 2012/0271920 A1* | 10/2012 | Isaksson | H04L 47/2416 |
| | | | 709/219 |
| 2013/0162550 A1* | 6/2013 | Chen | G06F 1/3262 |
| | | | 345/173 |
| 2013/0257752 A1* | 10/2013 | Tripathi | G09G 3/20 |
| | | | 345/173 |
| 2013/0329777 A1* | 12/2013 | Konda | H04L 67/04 |
| | | | 375/240.01 |

* cited by examiner

| RESOLUTION | FRAME RATE |
|---|---|
| 1920×1080 | 20 |
| 960×540 | 30 |

DISPLAY CONTROL APPARATUS, DISPLAY CONTROL METHOD, DISPLAY CONTROL SYSTEM, AND STORAGE MEDIUM

This application is a continuation of application Ser. No. 13/921,443, filed Jun. 19, 2013.

BACKGROUND OF THE INVENTION

Field of the Invention

The present invention relates to a display control apparatus, display control method, display control system, and storage medium.

Description of the Related Art

Conventionally, an image display system in which a transmission side apparatus which stores moving image data captured by a camera or the like transfers moving image data in response to a request from a reception side apparatus is known. In the reception side apparatus, moving image data is continuously reproduced and displayed when a CPU (Central Processing Unit) executes software.

Upon execution of such moving image reproduction, frames to be reproduced are thinned out according to a load state on the CPU or the like, or a next frame to be displayed is selected in consideration of an amount of time required until reproduction.

Japanese Patent Laid-Open No. 8-163556 discloses a display apparatus which includes an arrangement for arbitrarily changing a display frame rate upon displaying moving image data.

Also, Japanese Patent Laid-Open No. 8-116513 discloses a reproduction apparatus which calculates a next image frame to be displayed and its display start time based on a predetermined amount of time required until moving image data per frame is displayed and a load state on a CPU of a display terminal at that time.

However, with the technique described in Japanese Patent Laid-Open No. 8-163556, when the load imposed on the display apparatus becomes heavier, an operation on a user interface (UI) is delayed. In such situation, it is not easy for the user to change a display frame rate of moving image data to be reproduced via the UI. Alternatively, when the load imposed on the display apparatus becomes lighter, and moving image data can be displayed at a higher frame rate, the user has to manually change the display frame rate of moving image data, resulting in troublesome operations.

On the other hand, with the Japanese Patent Laid-Open No. 8-116513, a frame to be reproduced and its start time are decided according to the load state on the CPU of the reproduction apparatus. Therefore, when an operation on a UI is delayed although the load state on the CPU of the reproduction apparatus is light, the reproduction apparatus cannot execute processing for the delay.

When image data is reproduced continuously, an image is displayed more smoothly by shortening display intervals of the image data. However, on the other hand, since the amount of image data to be displayed increases, a processing load on an image display apparatus which displays image data becomes heavier, thus impairing the operability of the UI.

SUMMARY OF THE INVENTION

In consideration of the above problems, the present invention provides a technique for displaying an image at an appropriate display frame rate without impairing the operability of a UI in an image display apparatus which displays moving image data.

According to one aspect of the present invention, there is provided a display control apparatus, which executes control required to display a moving image, received via a network, on a display unit, the apparatus comprising: an input unit configured to input an operation instruction required to operate the display control apparatus; and a control unit configured to execute control required to display, on the display unit, a moving image at a frame rate depending on whether or not processing according to the operation instruction input by the input unit is executed.

Further features of the present invention will become apparent from the following description of exemplary embodiments (with reference to the attached drawings).

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

The first embodiment will explain an arrangement in which a client receives moving image data transmitted from a camera server (image capturing apparatus), adjusts a display frame rate, and then displays the received moving image data.

Figure 1:
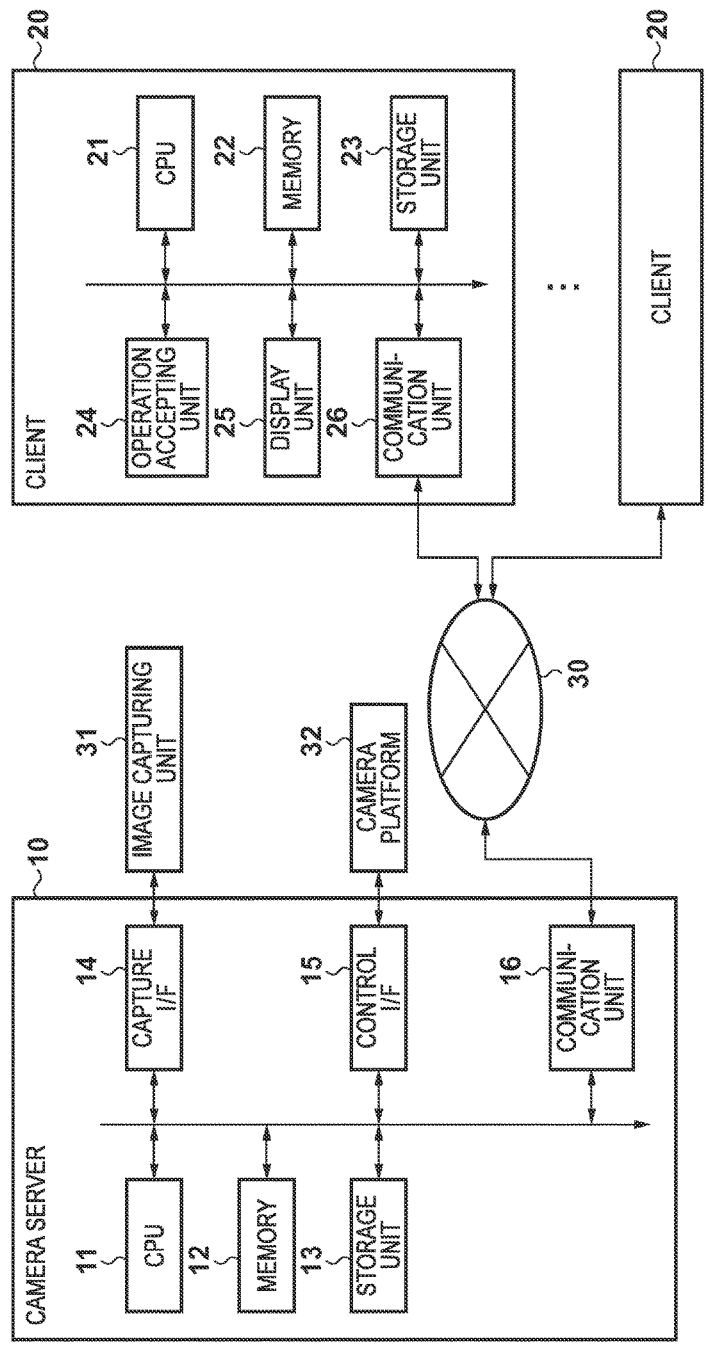
FIG. 1 is a block diagram showing an example of the arrangement of an image display system according to the first embodiment.

An example of the arrangement of an image display system including an image display apparatus (client) according to the first embodiment and a camera server (image capturing apparatus) will be described first with reference to FIG. 1. In the image display system shown in FIG. 1, a camera server 10 and a plurality of clients 20 are connected to be able to communicate with each other via a network 30 such as a LAN (Local Area Network) or WAN (Wide Area Network). Note that the camera server 10 and the plurality of clients 20 need not always be connected via the network, and for example, they may be connected via a USB (Universal Serial Bus) or the like. Hence, the connection method is not particularly limited.

The camera server 10 (image capturing apparatus 10) includes a CPU (Central Processing Unit) 11, memory 12, storage unit 13, capture I/F 14, control I/F 15, and communication unit 16. The CPU 11 controls various kinds of processing in the camera server 10. The memory 12 includes, for example, a RAM (Random Access Memory), ROM (Read Only Memory), and the like. Processing in the camera server 10 is implemented, for example, when the CPU 11 loads a program stored in the ROM or storage unit 13 using the memory 12 as a work area, and executes the loaded program. The storage unit 13 includes, for example, a hard disk drive or the like, and stores various programs (for example, applications, an OS, and the like).

The capture I/F 14 is a communication interface with an image capturing unit 31 (for example, a camera or the like) 31, converts and compresses an image captured by the image capturing unit 31 into a predetermined format, and stores the converted image in, for example, the memory 12 or the like. The control I/F 15 is a communication interface with a camera platform 32, obtains states of a pan mechanism, tilt mechanism, and rotation mechanism of the camera platform 32, and controls the camera platform 32. The communication unit 16 is a communication interface required to communicate with external apparatuses (for example, the clients 20). The camera server 10 exchanges, for example, images with the clients 20 via the communication unit 16.

Each client (image display apparatus) 20 includes a CPU 21, memory 22, storage unit 23, operation accepting unit 24, display unit 25, and communication unit 26. Note that the CPU 21, memory 22, storage unit 23, and communication unit 26 fulfill the same functions as those of the corresponding components included in the aforementioned camera server 10, and a description thereof will not be given. The operation accepting unit 24 includes, for example, a mouse, keyboard, and the like, and inputs various instructions from the user into the client 20. The display unit 25 includes, for example, a display or the like, and displays various kinds of information for the user.

Figure 2:
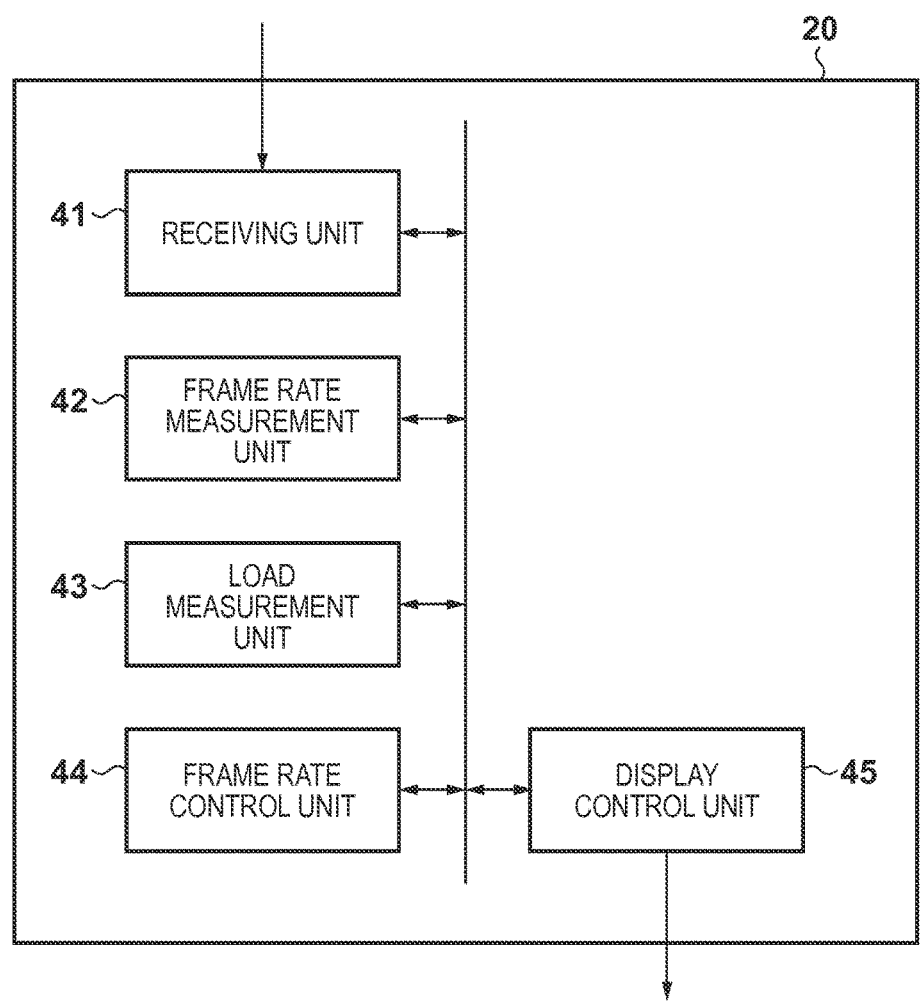
FIG. 2 is a block diagram showing an example of the functional arrangement of a client 20 according to the first embodiment.

An example of the functional arrangement of the image display apparatus 20 (client 20) according to the first embodiment will be described below with reference to FIG. 2.

The client 20 includes a receiving unit 41, frame rate measurement unit 42, load measurement unit 43, frame rate control unit 44, and display control unit 45. The receiving unit 41 obtains a plurality of images to be displayed. The frame rate measurement unit 42 measures the number of images received by the receiving unit 41 per unit time. The load measurement unit 43 measures the number of processing gaps with respect to UI operations (user operations) input by the operation accepting unit 24 by mouse operations or the like from the user. That is, the load measurement unit 43 counts the number of times of an event (to be described later). This event is generated when there is no UI operation to be processed and when processing corresponding to a UI operation ends. The load measurement unit 43 judges the presence/absence of this event. Also, the load measurement unit 43 determines a load state of processing with respect to UI operations based on the number of times of generation of this event. This event indicates a processing gap with respect to a UI operation, and the number of times of generation of this event corresponds to the number of processing gaps with respect to UI operations.

The UI operations include, for example, an operation for moving a dialog box displayed on the display unit 25 on a screen. For example, the user can move the dialog box displayed on the display unit 25 by dragging and dropping it by operating a mouse connected to the client 20. Also, the UI operations include, for example, an operation for pressing an operation button so as to perform an operation required to change an image capturing direction of the camera. The UI operations are not limited to those examples.

The frame rate control unit 44 decides a display frame rate based on the reception frame rate measured by the frame rate measurement unit 42 and the load state measured by the load measurement unit 43. The frame rate control unit 44 decides a display frame rate at predetermined intervals (for example, 1-sec intervals). After the frame rate control unit 44 decides the display frame rate, it initializes the number of processing gaps with respect to UI operations. This number of processing gaps is measured by the load measurement unit 43. Note that when a display frame rate is decided at 1-sec intervals, and when processing for a UI operation ends within 1 sec, an event indicating a processing gap with respect to UI processing is generated. On the other hand, when the processing for the UI operation does not end within 1 sec, the number of times of generation of the event remains unchanged from zero. The display control unit 45 displays images received by the receiving unit 41 on the display unit 25 according to the display frame rate decided by the frame rate control unit 44.

The client 20 can change a display frame rate by, for example, changing a frequency of image frame requests to the camera server 10. Alternatively, for example, the client 20 can change a display frame rate of moving image data by transmitting, to the camera server 10, a command to change a transmission frame rate value of moving image data set in the camera server 10. Alternatively, the client 20 may receive moving image data at a predetermined frame rate from the camera server 10, and may change a frame rate of moving image data to be displayed upon displaying the moving image data on the display unit 25. The display frame rate change method is not limited to the aforementioned methods, and is not particularly limited.

Figure 3:
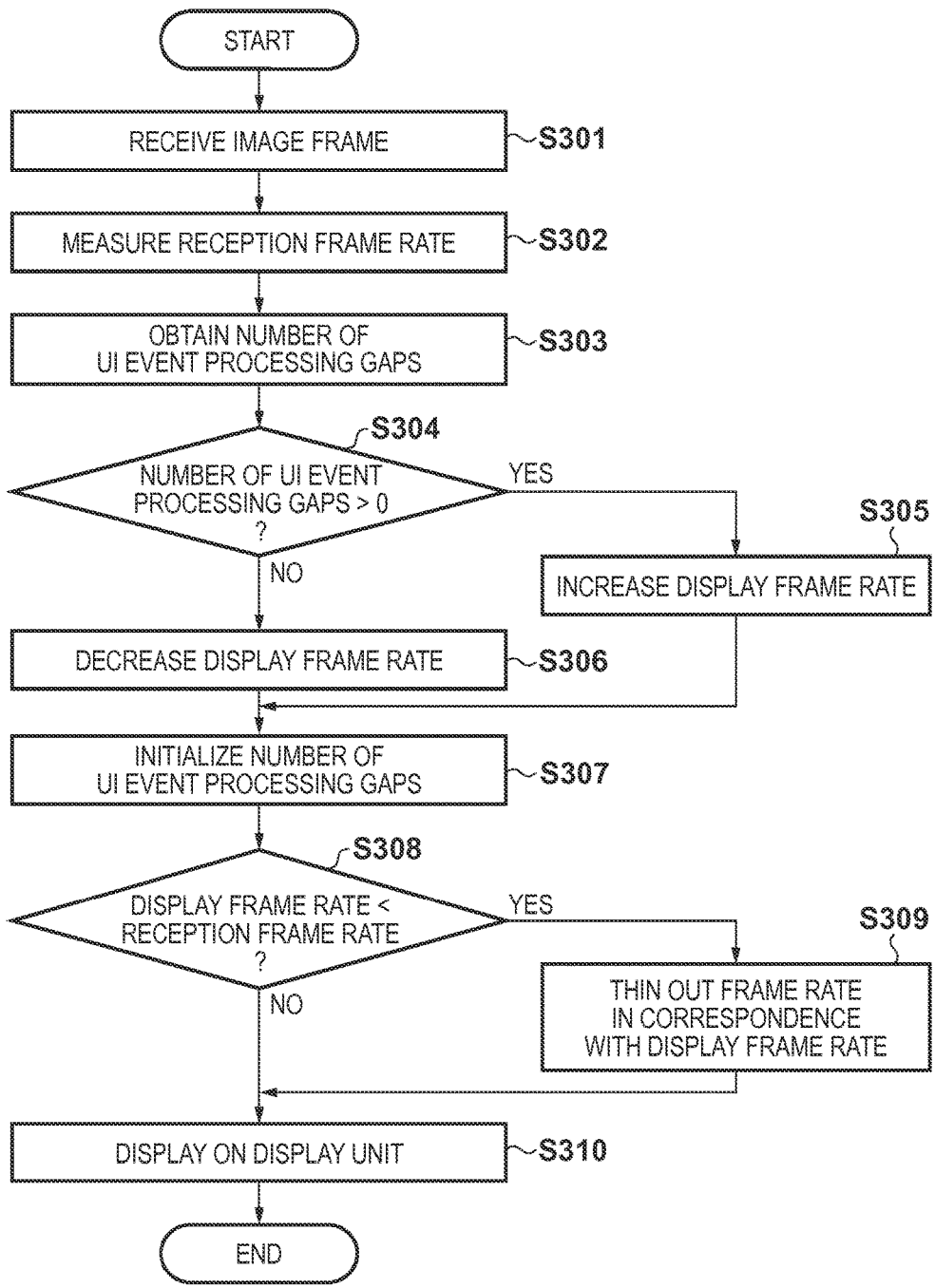
FIG. 3 is a flowchart showing an example of the sequence of processing to be executed by the client 20 according to the first embodiment.

An example of the sequence of processing to be executed by the image display apparatus 20 (client 20) according to the first embodiment will be described below with reference to the flowchart shown in FIG. 3. In this case, processes executed by respective processing units, that is, the receiving unit 41 to the display control unit 45, which have been described above with reference to FIG. 2, will be described. Note that the processing shown in FIG. 3 is started, for example, when the client 20 is activated and is connected to the camera server 10.

In step S301, the receiving unit 41 sends an image request to the camera server 10 via the communication unit 26, and receives image frames from the camera server 10 as a response. In step S302, the frame rate measurement unit 42 measures a reception frame rate based on the number of image frames continuously received per second.

In step S303, the load measurement unit 43 measures the number of processing gaps with respect to UI operations input by the operation accepting unit 24 by mouse operations or the like from the user. That is, the load measurement unit 43 judges the presence/absence of an event indicating that there is no user operation to be processed. The number of times of generation of the event indicating that there is no user operation to be processed indicates a processing load on a user operation.

In step S304, the frame rate control unit 44 determines the number of processing gaps with respect to UI operations. If the frame rate control unit 44 determines that the number of processing gaps is 1 or more (YES in step S304), it executes processing of step S305. On the other hand, if the frame rate control unit 44 determines that the number of processing gaps is zero (NO in step S304), it executes processing of step S306. The number of processing gaps with respect to UI operations is zero when processing for a UI operation does not end within 1 sec.

In step S305, the frame rate control unit 44 determines that the processing load on a UI operation is light, and increases a display frame rate. When the number of gaps is 1 or more, since there is no UI operation to be processed, or an event indicating that processing for a UI operation ends is generated at least once per second, the frame rate control unit 44 determines that the processing load is light. Note that in this embodiment, determination is made at 1-sec intervals. However, the determination intervals are not limited to 1-sec intervals. Note that as the number of times of successful processing is larger, a display frame rate may be increased largely, but it may be increased by only a predetermined value. After the processing of step S305 is executed, the frame rate control unit 44 executes processing of step S307.

In step S306, the frame rate control unit 44 determines that the load is heavy, and decreases a display frame rate. After that, the frame rate control unit 44 advances to step S307.

In step S307, the frame rate control unit 44 initializes the count value of the number of processing gaps to zero. Note that when the count value of the number of processing gaps is already zero, the frame rate control unit 44 may skip the processing of step S307, and may execute processing of step S308.

In step S308, the frame rate control unit 44 compares the display frame rate, which is adjusted to be increased or decreased with the reception frame rate measured by the frame rate measurement unit 42. More specifically, the frame rate control unit 44 determines whether or not the reception frame rate of moving image data received from the camera server 10 is higher than the display frame rate of moving image data to be displayed on the display unit 25.

If the frame rate control unit 44 determines that the reception frame rate is higher than the display frame rate (YES in step S308), it executes processing of step S309. On the other hand, if the frame rate control unit 44 determines that the reception frame rate is lower than the display frame rate (NO in step S308), it executes processing of step S310.

In step S309, the frame rate control unit 44 executes thinning processing of image frames received beyond the display frame rate. That is, the frame rate control unit 44 reduces a frame rate of the received moving image data to be close to the display frame rate. After that, the frame rate control unit 44 executes processing of step S310.

In step S310, when the thinning processing is executed, the display control unit 45 displays image frames thinned out by the frame rate control unit 44 on the display unit 25 including a display or the like. On the other hand, when the thinning processing is not executed, the display control unit 45 displays all the received image frames on the display unit 25. The respective processes of the flowchart shown in FIG. 3 end.

The client 20 can implement the thinning processing by, for example, decreasing a frequency of image frame requests to the camera server 10. Alternatively, the client 20 can implement the thinning processing by transmitting, to the camera server 10, a command to decrease a transmission frame rate value of moving image data set in the camera server 10. Alternatively, the client 20 receives moving image data at a predetermined frame rate from the camera server 10, and decides image frames which are not displayed of the received image frames, thus implementing the thinning processing. The thinning processing method is not limited to the aforementioned methods, and is not particularly limited.

Processing to be executed when the display frame rate is equal to the reception frame rate in step S308 is not particularly limited. When the display frame rate is equal to the reception frame rate, for example, the frame rate control unit 44 can execute the processing of step S310 after that of step S309. Alternatively, when the display frame rate is equal to the reception frame rate, for example, the frame rate control unit 44 can execute the processing of step S310 without executing that of step S309.

As described above, according to this embodiment, by measuring the number of processing gaps with respect to UI operations made by the user, the processing load state on a UI operation is measured, thus automatically adjusting a display frame rate to an appropriate value. Thus, image frames can be displayed at an appropriate display frame rate without delaying a user's UI operation according to the processing load state on the UI operation. In this manner, the image display apparatus which displays moving image data can display an image at an appropriate display frame rate without impairing the UI operability.

Second Embodiment

The second embodiment will explain an arrangement for initializing a display frame rate to a predetermined value when a resolution of an image frame has changed.

Figure 4:
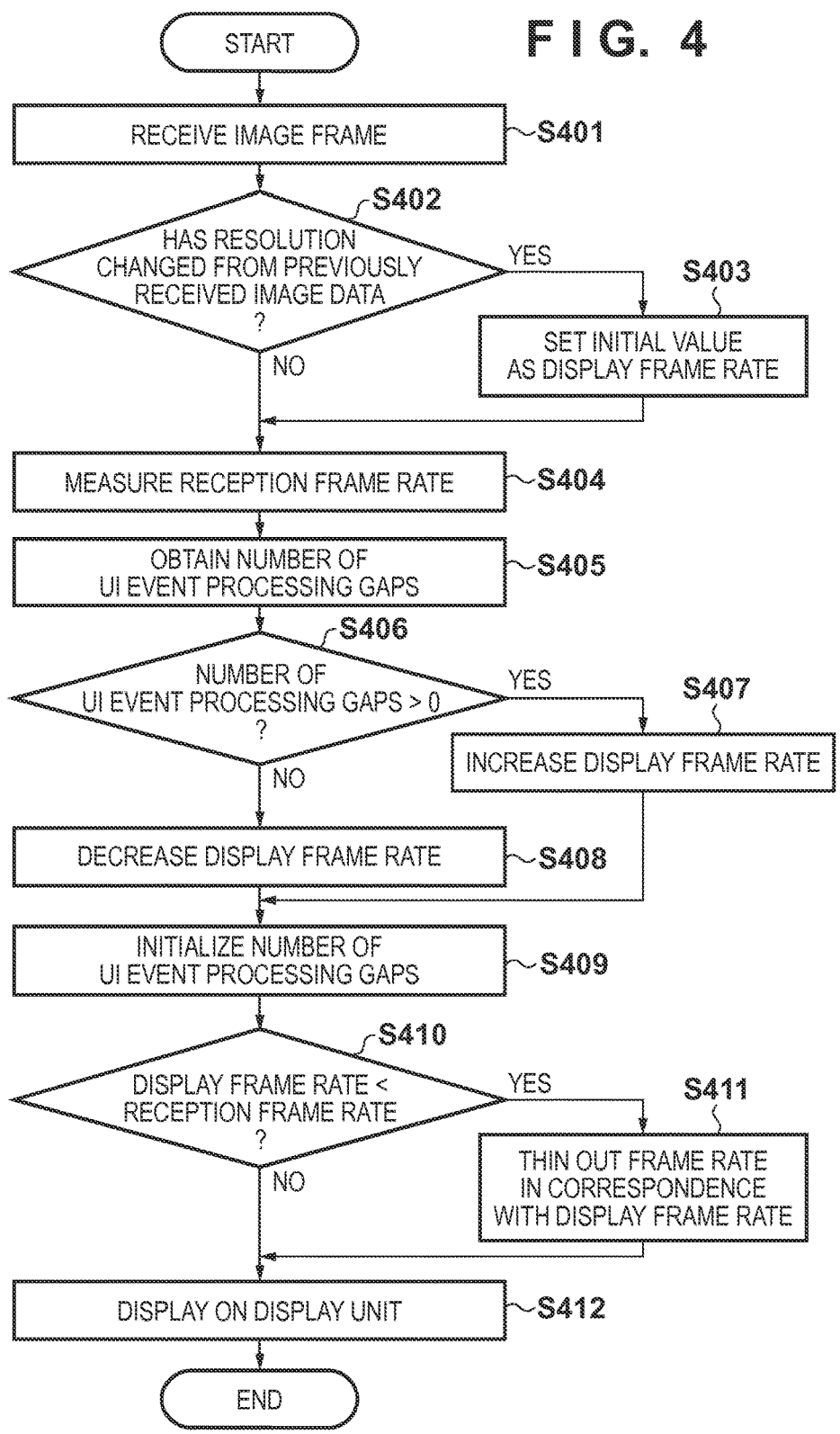
FIG. 4 is a flowchart showing an example of the sequence of processing to be executed by a client 20 according to the second embodiment.

An example of the sequence of processing to be executed by an image display apparatus 20 (client 20) according to the second embodiment will be described below with reference to the flowchart shown in FIG. 4. In FIG. 4, since processing of step S401 is that of step S301 described with reference to FIG. 3, and processes of steps S404 to S412 are the same as those of steps S302 to S310, a description thereof will not be repeated. Also, since the arrangement of the client 20 according to this embodiment is the same as that of the first embodiment, a description thereof will not be repeated. A receiving unit 41 determines in step S402 whether or not a resolution previously obtained for a previously received image frame is different from that currently obtained for a currently received image frame. If the receiving unit 41 determines that the resolutions are different or there is no previously received image frame (YES in step S402), a frame rate control unit 44 executes processing of step S403. On the other hand, if the receiving unit 41 determines that the two resolutions are the same (NO in step S402), the frame rate control unit 44 executes processing of step S404 without changing a display frame rate.

In step S403, the frame rate control unit 44 sets a display frame rate to be a predetermined initial value. After that, the frame rate control unit 44 executes the processing of step S404.

As described above, according to this embodiment, when a resolution of an image frame has changed, a display frame rate is initialized to a predetermined value. Thus, even when a resolution of an image frame has changed, since a display frame rate is automatically initialized, the user's convenience can be further improved without delaying user's UI operations.

Third Embodiment

The third embodiment will explain an arrangement which stores proper display frame rates for respective resolutions of image frames, and sets a stored display frame rate as an initial display frame rate when the resolution has changed.

Figure 5:
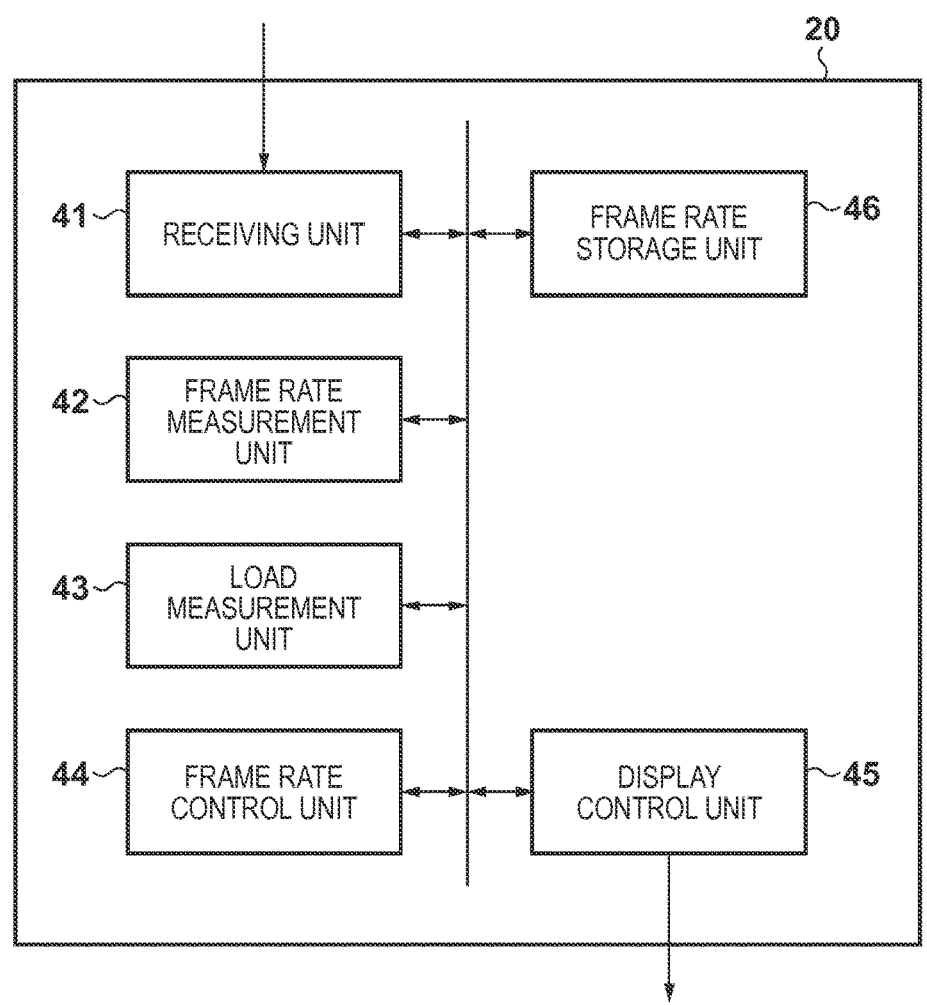
FIG. 5 is a block diagram showing an example of the functional arrangement of a client 20 according to the third embodiment.

An example of the functional arrangement of an image display apparatus 20 (client 20) according to the third embodiment will be described below with reference to FIG. 5. The client 20 according to this embodiment further includes a frame rate storage unit 46 in addition to the functional arrangement (a receiving unit 41, frame rate measurement unit 42, load measurement unit 43, frame rate control unit 44, and display control unit 45) of the client 20 according to the first embodiment described with reference to FIG. 2.

The frame rate storage unit 46 stores a display frame rate decided by the frame rate control unit 44 together with a resolution of an image frame. Also, the frame rate storage unit 46 reads out the stored display frame rate, and sets an initial display frame rate.

Figure 6:
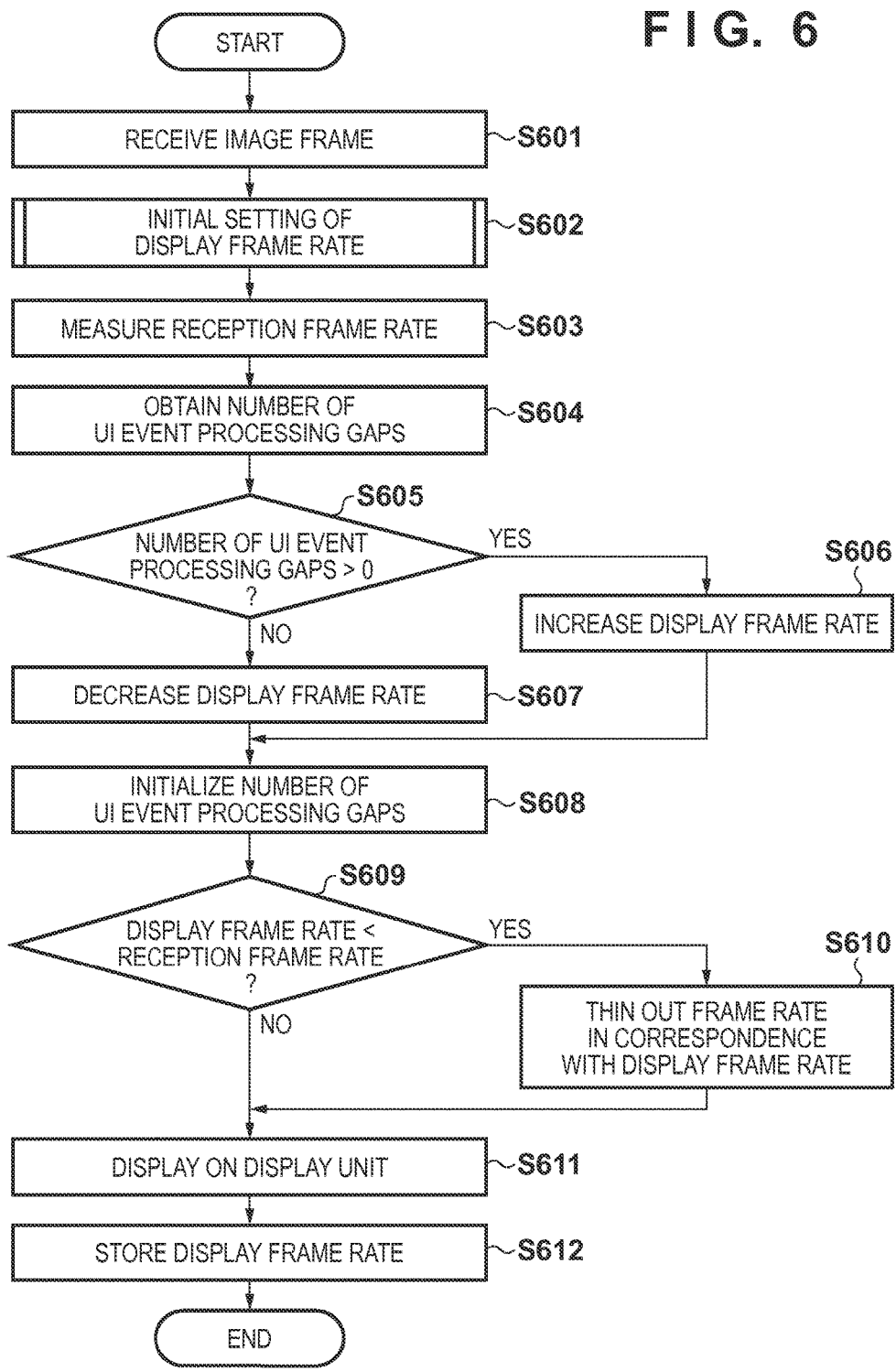
FIG. 6 is a flowchart showing an example of the sequence of processing to be executed by the client 20 according to the third embodiment.

An example of the sequence of processing to be executed by the image display apparatus 20 (client 20) according to the third embodiment will be described below with reference to FIG. 6. In FIG. 6, since processing of step S601 is the same as that of step S301 described with reference to FIG. 3, and processes of steps S603 to S611 are the same as those of steps S302 to S310, a description thereof will not be repeated.

Figure 7:
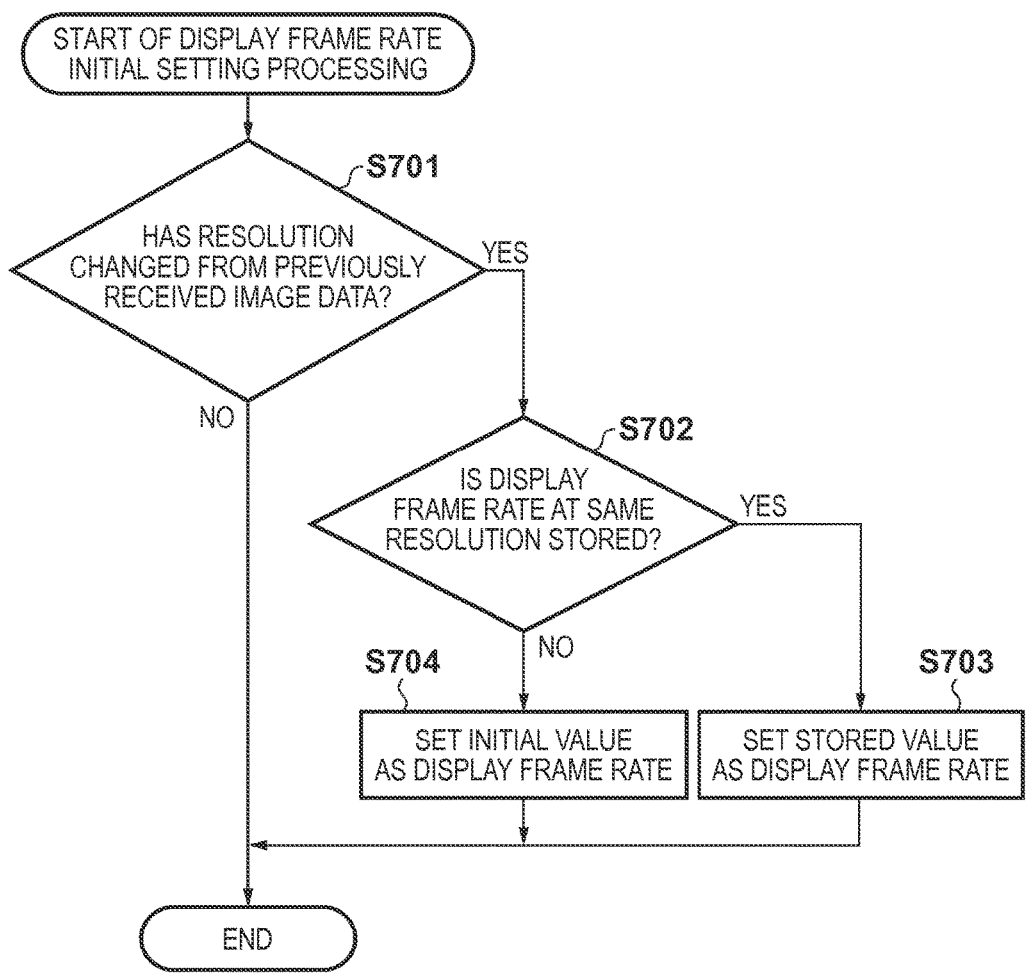
FIG. 7 is a flowchart showing an example of the sequence of display frame rate initial setting processing to be executed by the client 20 according to the third embodiment.

In step S602, the receiving unit 41 initially sets a display frame rate. Details of the display frame rate initial setting processing will be described below with reference to the flowchart shown in FIG. 7.

The receiving unit 41 determines in step S701 whether a resolution of a previously received image frame is different from that of a currently received frame. If the receiving unit 41 determines that the resolutions are different or there is no previously received image frame (YES in step S701), the frame rate control unit 44 executes processing of step S702. On the other hand, if the receiving unit 41 determines that the two resolutions are the same (NO in step S701), the frame rate control unit 44 ends this processing.

The frame rate control unit 44 determines in step S702 whether or not a display frame rate corresponding to the same resolution as that of the currently received image frame is stored in the frame rate storage unit 46. If the frame rate control unit 44 determines that the display frame rate at the same resolution is stored (YES in step S702), the process advances to step S703. On the other hand, if the frame rate control unit 44 determines that the display frame rate at the same resolution is not stored (NO in step S702), the process advances to step S704.

In step S703, the frame rate control unit 44 sets a value stored in the frame rate storage unit 46 as a display frame rate, thus ending the processing. In step S704, the frame rate control unit 44 sets a predetermined value as a display frame rate, thus ending the processing. After the processing shown in FIG. 7 ends, the process returns to FIG. 6, and the processes of steps S603 to S611 are executed.

In step S612, the frame rate storage unit 46 stores a display frame rate value adjusted during the processes of steps S603 to S611 in association with a resolution of an image frame. In this case, the display frame rate value and the resolution of the image frame, which are stored in association with each other, are stored as a table. By executing the aforementioned processing every time an image frame is received, the table is fulfilled. As described above, the respective processes of the flowchart shown in FIG. 6 end.

As described above, according to this embodiment, a display frame rate is stored for each resolution of an image frame. Then, when the resolution of an image frame has changed, a display frame rate is set to be that of a moving image previously received to have the same resolution. Thus, even when the resolution of an image frame has changed, since the display frame rate of the previously received image frame is applied, image frames can be displayed at an optimal display frame rate within a smaller amount of time without delaying user's UI operations.

Fourth Embodiment

The fourth embodiment will explain an arrangement which stores a display frame rate using a storage apparatus, loads the display frame rate of a previous display operation at the same resolution at the next client activation timing, and sets the loaded display frame rate as an initial display frame rate.

Figures 8, 9:
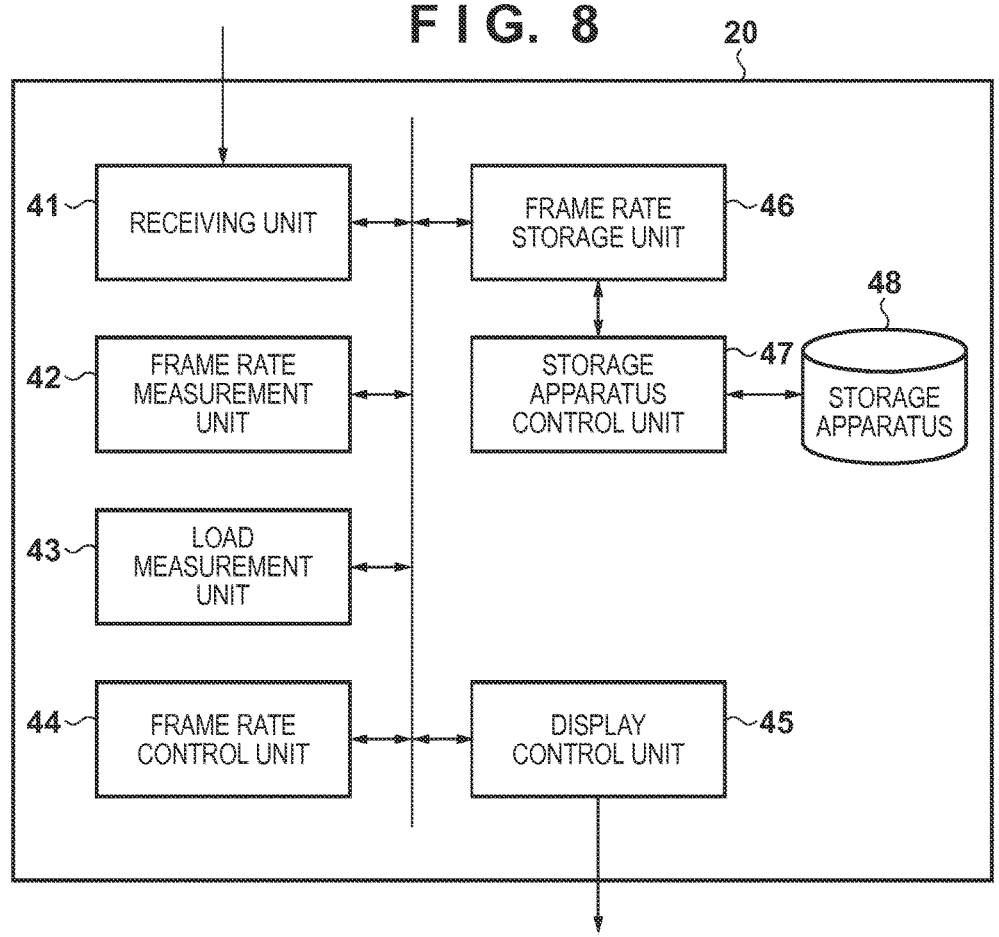
FIG. 8 is a block diagram showing an example of the functional arrangement of a client 20 according to the fourth embodiment.
FIG. 9 is a table showing an example of data stored in a storage apparatus 48 included in the client 20 according to the fourth embodiment.

An example of the functional arrangement of an image display apparatus 20 (client 20) according to the fourth embodiment will be described first with reference to FIG. 8. The client 20 according to this embodiment further includes a storage apparatus control unit 47 and storage apparatus 48 in addition to the functional arrangement (a receiving unit 41, frame rate measurement unit 42, load measurement unit 43, frame rate control unit 44, display control unit 45, and frame rate storage unit 46) of the client 20 according to the third embodiment described with reference to FIG. 5.

The storage apparatus control unit 47 records display frame rate information stored in the frame rate storage unit 46 in the storage apparatus 48. Also, the storage apparatus control unit 47 obtains information recorded in the storage apparatus 48, and sets it in the frame rate storage unit 46.

An example of display frame rate information recorded in the storage apparatus 48 will be described below with reference to FIG. 9. A resolution 100 is that of an image frame received by the receiving unit 41. A frame rate 101 is a display frame rate decided by the frame rate control unit 44. When the same resolution as that of a currently received image frame is not recorded in the resolution 100, the storage apparatus control unit 47 newly records a resolution 100 and a frame rate 101, which is decided by the frame rate control unit 44 in association with that image frame, in association with each other. When the same resolution as that of the currently received image frame is recorded in the resolution 100, the storage apparatus control unit 47 updates the value of the corresponding frame rate 101 by a value decided by the frame rate control unit 44 in association with that image frame. Note that one frame rate need not always be stored in association with one resolution. For example, a resolution range is set, and when the resolution of the currently received image frame falls within that range, one corresponding frame rate may be set.

As described above, according to this embodiment, a display frame rate is stored using the storage apparatus. At the next client activation timing, the display frame rate in a previous display operation at the same resolution is loaded, and is set as an initial display frame rate. For this reason, a display frame rate can be efficiently set since it is not initialized every activation.

In this manner, when the apparatuses such as the client and camera server end, since the display frame rate of previously received image frames is applied, image frames can be displayed at an optimal display frame rate within a smaller amount of time without delaying user's UI operations.

Fifth Embodiment

The fifth embodiment is an embodiment in which a received moving image is displayed in preference to a UI operation without adjusting a display frame rate. The fifth embodiment will explain a case in which a function of skipping adjustment of a display frame rate when the user wants to display an image in preference to a UI operation as a modification of the first embodiment.

Figure 10:
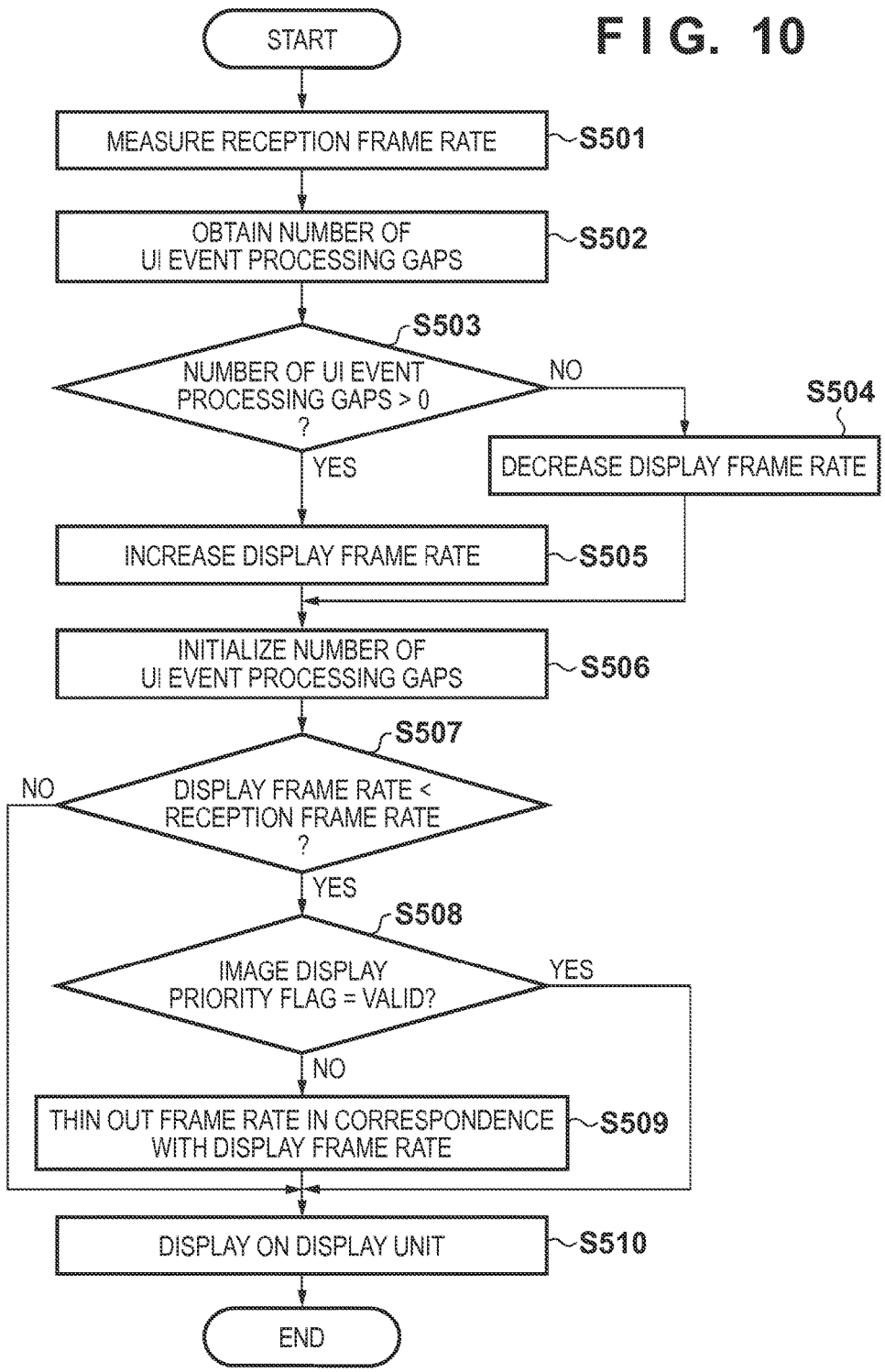
FIG. 10 is a flowchart showing an example of the sequence of processing to be executed by a client 20 according to the fifth embodiment.

An example of the sequence of processing of a client 20 according to the fifth embodiment will be described below with reference to FIG. 10. In this case, as for processing after the client 20 receives image frames from a camera server 10, the sequence of processes from a receiving unit 41 to a display control unit 45 described with reference to FIG. 2 will be explained. Note that processes from measurement of a reception frame rate (step S501) until determination of a display frame rate and reception frame rate (step S507) are the same as those described in the first embodiment with reference to FIG. 3, and a description thereof will not be repeated.

A frame rate control unit 44 determines in step S508 whether or not an image display priority flag is valid. If the frame rate control unit 44 determines that the image display priority flag is valid (YES in step S508), the process jumps to step S510. On the other hand, if the image display priority flag is invalid (NO in step S508), the process advances to step S509.

In step S509, the frame rate control unit 44 judges that preference to processing for a user operation is designated, and thins out image frames received beyond a display frame rate. Next, the display control unit 45 displays image frames thinned out by the frame rate control unit 44 on a display or the like (display unit 25).

In step S510, the frame rate control unit 44 does not adjust the display frame rate, and the display control unit 45 displays all received image frames on a display or the like (display unit 25).

Figure 11:
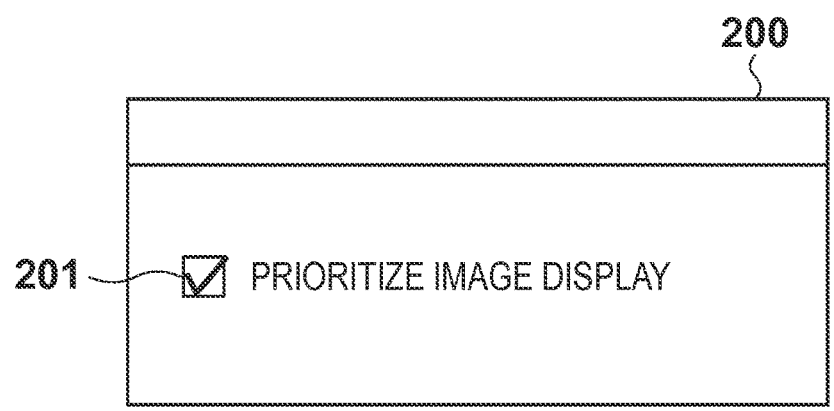
FIG. 11 is a view showing an example of a setting UI in the client 20 according to the fifth embodiment.

An example of a UI used to set the image display priority flag to be valid or invalid will be described below with reference to FIG. 11.

An image display priority setting dialog 200 is displayed on the display unit 25 of the client 20. An image display priority setting check box 201 validates an image display priority setting when it is checked, and invalidates the image display priority setting when it is unchecked.

As described above, according to the fifth embodiment, since a designation that prioritizes an image display operation is accepted, the image display operation can be executed in preference to a UI operation. Thus, by validating or invalidating the setting, an image display operation can always be preferentially executed.

Other Embodiments

Embodiments of the present invention can also be realized by a computer of a system or apparatus that reads out and executes computer executable instructions recorded on a storage medium (for example, non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-143527 filed on Jun. 26, 2012, which is hereby incorporated by reference herein in its entirety.

What is claimed is:

1. A display control apparatus, which executes control required to display a moving image, received via a network, on a display unit, said display control apparatus comprising:
circuitry configured to:
(1) control a display of the moving image on the display unit at a frame rate,
(2) determine a state of a processing for an operation instruction, the operation instruction being input from a graphical user interface displayed on a screen, and
(3) increase the frame rate for the moving image displayed on the display unit in a case where the determined state of the processing is an end state.

2. The display control apparatus according to claim 1, wherein the circuitry determines, for a predetermined time, whether or not the processing for the operation instruction is still being processed, and
wherein the circuitry increases the frame rate for the moving image in a case where the determined state of the processing becomes the end state by the predetermined time.

3. The apparatus according to claim 1, wherein the circuitry is further configured to decrease the frame rate for the moving image displayed on the display unit in a case where it is determined that the processing is still being processed.

4. A display control method, which executes control required to display a moving image, received via a network, on a display unit, the display control method comprising the steps of:

controlling a display of the moving image on the display unit at a frame rate;

determining a state of a processing for an operation instruction, the operation instruction being input from a graphical user interface displayed on a screen; and increasing the frame rate for the moving image displayed on the display unit in a case where the determined state of the processing is an end state.

5. The display control method according to claim 4, wherein whether or not the processing for the operation instruction is still being processed is determined by a predetermined time in the determining step, and wherein the frame rate for the moving image is increased in a case where the determined state of the processing becomes the end state by the predetermined time.

6. A non-transitory computer-readable storage medium storing a computer program for controlling a computer, which executes control required to display a moving image, received via a network, on a display apparatus, to execute sequences comprising:

a control sequence of controlling a display of the moving image on the display unit at a frame rate;

a determination sequence of determining a state of a processing for an operation instruction, the operation instruction being input from a graphical user interface displayed on a screen; and a control sequence of increasing the frame rate for the moving image displayed on the display unit in a case where the determined state of the processing is an end state.

7. The non-transitory computer-readable storage medium according to claim 6, wherein whether or not the processing for the operation instruction is still being processed is determined by a predetermined time in the determination sequence, and wherein the frame rate for the moving image is increased in a case where the determined state of the processing becomes the end state by the predetermined time.

* * * * *